2,895,952

PURIFICATION OF NOVOBIOCIN

Edward A. Kaczka, Union, N.J., assignor to Merck & Co., Inc., Rahway, N.J., a corporation of New Jersey No Drawing. Application April 21, 1955
Serial No. 503,030

1 Claim. (Cl. 260—210)

This invention relates to processes useful in the purification of antibiotics. More particularly, it is concerned with processes useful in the purification of novobiocin, a new antibiotic.

The new antibiotic substance novobiocin is a valuable product which is effective in inhibiting the growth of pathogenic bacteria, especially gram-positive microorganisms. It is produced by growing a previously unknown species of microorganism which has been named *Streptomyces spheroides* in suitable aqueous nutrient mediums under aerobic conditions. A culture of this novobiocin-producing organism has been deposited with the Fermentation Section of the Northern Utilization Research Branch of the United States Department of Agriculture, Peoria, Illinois, and added to its permanent culture collection as NRRL 2449.

It is an object of the present invention to provide novel processes for the isolation of novobiocin from fermentation broth. Another object is to provide processes for the purification of novobiocin. A further object is to provide a process for the preparation of novobiocin in crystalline form. Other objects will be apparent from the detailed description hereinafter provided.

In accordance with one embodiment of the present invention, it is now found that novobiocin can be purified and isolated by acidification of an alkaline solution of novobiocin. The antibiotic which is weakly acidic, is essentially insoluble in acidic aqueous solutions, and therefore this method provides a most convenient means of isolating the product from solution and at the same time affecting considerable purification. Thus, this method can be used to recover novobiocin from aqueous solutions obtained by filtering alkaline fermentation broth produced by growing *Streptomyces spheroides* in suitable aqueous nutrient mediums under aerobic conditions. For example, by acidifying the alkaline fermentation broth with hydrochloric acid to a pH of about 2, essentially all of the novobiocin is precipitated and can be readily recovered in solid form. A good part of the contaminants occurring in the fermentation broth are soluble in the acidic solution and are therefore simultaneously separated from the precipitated novobiocin.

I have found that in using this method of isolating and purifying novobiocin occurring in the fermentation broth the precipitation of the antibiotic is preferably effected in the presence of a diatomaceous filter aid or similar substance. When the novobiocin is precipitated in this manner, it is readily and conveniently recovered by filtration. In carrying out the precipitation in this manner, it has been found that the addition of about 5 lbs. of diatomaceous filter aid per 100 gallons of novobiocin-containing solution is sufficient and will result in the obtainment of a readily filterable precipitate. However, larger or smaller amounts of the filter aid can be used depending upon the particular solution from which the novobiocin is to be precipitated.

In effecting the isolation of novobiocin from aqueous alkaline solutions of novobiocin obtained from fermentation broths, I find that it is advantageous to employ a hydrohalic acid such as hydrochloric acid for acidifying the broth, although other acids which do not affect the antibiotic can be similarly employed for this purpose. The use of hydrochloric acid is particularly advantageous since many of the contaminants occurring in the fermentation broth are soluble in aqueous hydrochloric acid solution and can therefore be readily separated from the precipitated antibiotic.

Pursuant to a further embodiment of my present invention, it is now found that additional purification of the crude novobiocin obtained by precipitation from acidified fermentation broths can be achieved by dissolving the precipitated product in a soluble solvent for novobiocin, such as, ethanol, methanol, acetone, dioxane, methyl ethyl ketone, and the like, evaporating the solvent from the resulting solution, and extracting an aqueous alkaline solution of the residue with butanol. This extraction with butanol is preferably carried out on an alkaline solution of the antibiotic having a pH of about 9.0. In this manner the monosodium salt of novobiocin is extracted into the butanol layer and separated from contaminant impurities which are insoluble in this solvent.

Another method for effecting purification of crude novobiocin precipitate obtained by acidifying aqueous fermentation broths comprises trituration of this product with petroleum ether whereby contaminants precipitated with the novobiocin can be removed without affecting the novobiocin. This purification step is very useful in removing oily fermentation by-products which are precipitated with the novobiocin. Thus, the novobiocin recovered from the butanol extracts described above are conveniently purified by trituration with petroleum ether. For example, the butanol extracts can be evaporated to remove the solvent and the resulting residues dissolved in an aqueous alkaline solution, and the novobiocin is precipitated by acidification as described above. After recovering and drying the precipitated novobiocin under diminished pressure, the product so obtained is then thoroughly triturated with petroleum ether which removes about 20–25% of the oily fermentation by-products which remain throughout previous purification procedures.

In accordance with other embodiments of my invention, I have found that purification of crude novobiocin is achieved by intimately contacting a solution of novobiocin in a soluble solvent such as methanol, ethanol, acetone, dioxane, methyl ethyl ketone, and the like, with acid-washed alumina. An alumina ratio of at least 50:1 based on the total solids present in the feed solution must be used in order to obtain a satisfactory purification. This can be done in batchwise fashion by mixing the acid-washed alumina with a solution of the antibiotic, filtering off the alumina containing the adsorbed impurities, and recovering the impure antibiotic from the resulting solution. However, I prefer to carry out the purification with acid-washed alumina by passing a solution of the novobiocin through a column of acid-washed alumina and washing the column with a suitable solvent for novobiocin. In this manner, considerable purification of the novobiocin is achieved and crystalline novobiocin can be recovered from the resulting effluent. In carrying out the columnwise purification of novobiocin, I have found it to be particularly advantageous to use an ethanol solution of novobiocin and to recover the novobiocin from the column of alumina by washing with additional ethanol, since crystalline novobiocin can be recovered from the resulting ethanol eluate by concentrating the eluate to a small volume and allowing the aqueous ethanol solution to stand until the desired product crystallizes out. If desired, the crystalline product so obtained can be further purified by recrystallization from acetone-petroleum ether to obtain substantially pure crystalline novobiocin. Thus, the impure novobiocin crystals can be dissolved in anhydrous acetone to a concentration of about 5% and sufficient petroleum ether added to produce a slight turbidity. Upon standing, the resulting solution deposits crystals of essentially pure novobiocin. During this recrystallization process I have also found it desirable to effect further purification by treating the acetone solution of novobiocin with activated charcoal, removing the activated charcoal, and adding the petroleum ether to the filtered acetone solution whereupon crystals of essentially pure novobiocin are obtained.

The above-described processes for the isolation and purification of novobiocin can be used separately to purify novobiocin containing various impurities. Alternatively, these processes can be used in combination, for example, in recovering and purifying novobiocin present in fermentation broth to produce crystalline novobiocin. As will be obvious to those skilled in this art, the order of the steps can be changed, or in certain cases they may not be necessary for the purification of certain impure novobiocin.

The following example is illustrative embodiments of the above-described methods of isolating and purifying novobiocin.

EXAMPLE 1

Novobiocin was isolated in purified form from a fermentation broth prepared by growing *Streptomyces spheroides* in an aqueous nutrient medium as follows:

After filtering the whole broth at pH 9.0, 5 lbs. of diatomaceous earth filter aid (Hyflo Supercel) per 100 gal. of filtered broth was added. The broth was slowly acidified to pH 2.0 with hydrochloric acid. After 10 minutes agitation the batch was filtered and the cake washed with water. No detectable activity was present in the acid filtrate. The solids precipitated, exclusive of the filter aid, were ca. 0.2-0.3% pure.

The filter cake from acid precipitation was extracted twice with 85% aqueous methanol at pH 9.0 using approximately one-tenth the original broth volume for each extraction. Overall recovery through this extraction was approximately 80% of the total bioactivity present in the broth. The solids in solution were 1-1.5% pure.

The aqueous methanol solution was concentrated to a water solution ca. one-tenth the volume of the original methanol solution. The pH was adjusted to 9.0 with caustic soda and the solution was extracted twice with equal volumes of n-butanol. The apparent distribution ratio at pH 9.0 is ca. 40:1. The solids in the butanol extract were 4-6% pure.

The butanol extract was concentrated to one-tenth the original volume and added to 15 volumes of water at pH 9.0. Filter aid (Hyflo Supercel) was added (ca. 0.5 gm./gal. based on original broth volume) and the pH was slowly adjusted to 2.0 by the addition of hydrochloric acid. All of the bioactivity is precipitated on the filter aid and is filtered off. Solids purity, exclusive of the filter aid, was ca. 10-12%.

The cake was dried in vacuo at 40° C., milled and triturated with petroleum ether until the filtrate was colorless. This eliminates 20-25% of the solids present and removes inactive oily fermentation products which remained through previous processing. No bioactivity was lost by this trituration and the solids remaining were found to be 12-15% pure.

The cake was extracted with anhydrous ethanol until the ethanol extracts were very light yellow in color. These extracts were combined and concentrated to a solution of 15-20% solids with a bioassay of ca. 200,000 u./cc. This solid material was 20-30% pure with a bioassay of 1,000-1,500 u./mg.

The concentrated ethanol solution was chromatographed on acid-washed alumina. An alumina ratio of 50:1, based on total solids present in the feed solution, must be used in order to obtain a satisfactory purification. The active material passes on through the column while a large amount of the extraneous solid material present remains on the column. The alumina column was eluted with ethanol to recover the novobiocin. Approximately 95% of the bioactivity was in 2.5-3 column void volumes.

Table 1

|  | Volume (cc.) | Bioassay (u./cc.) | mg./cc. | u./mg. | Total units |
|---|---|---|---|---|---|
| Col. feed | 1,000 | 220,000 | 265 | 830 | 220×10⁶ |
| Cut I [1] | 1,000 | 460 | 2.5 | 183 | 0.46×10⁶ |
| Cut II | 1,000 | 42,000 | 19.6 | 2,140 | 42×10⁶ |
| Cut III | 1,000 | 76,000 | 31.3 | 2,420 | 76×10⁶ |
| Cut IV | 1,000 | 62,000 | 22.3 | 2,780 | 62×10⁶ |
| Cut V | 1,000 | 37,000 | 13.4 | 2,760 | 37×10⁶ |
| Cut VI | 1,000 | 13,000 | 4.5 | 3,020 | 13×10⁶ |
| Cut VII | 1,000 | 4,500 | 1.3 | 3,450 | 4.5×10⁶ |
| Average | 7,000 | 33,500 | 13.2 | 2,520 | |

[1] 1st color.

Volume of alumina=8,000 cc.
Column void vol.=2,600 cc.

The ethanol eluate from the alumina column was concentrated to ca. 5% solids. Water was added to turbidity, slightly more than an equal volume being used, and the antibiotic allowed to crystallize. The crystallization took place very slowly. After five days there still remained in the supernatant liquors up to 15% of the original bioactivity. Agitation and/or temperature variation appear to have little effect upon the rate of crystallization. This crystalline novobiocin has a bioassay of about 2,500-3,000 u./mg.

This crystalline material was dissolved in anhydrous acetone to give a 30% solution. This solution was treated with an amount of Darco G-60 equal to twice the weight of the crystalline material dissolved. The Darco was filtered off and washed repeatedly with acetone to dilute the solution to a concentration of about 5% solids. Petroleum ether was added to turbidity and the novobiocin allowed to crystallize. 90-95% of the bioactivity was recovered and the crystalline novobiocin obtained assayed 4,500-5,000 u./mg.

The production of a fermentation broth for the preparation of novobiocin by submerged fermentation can be carried out as follows:

A Blake bottle containing 25 ml. of sterile aqueous agar medium consisting of

1% yeast extract
1% dextrose
0.12% $Na_2HPO_4$
0.075% $KH_2PO_4$
0.05% $MgSO_4 \cdot 7H_2O$
2% agar dissolved in water was inoculated with a loopful of soil from a soil culture of *Steptomyces spheroides* MA-319 (NRRL 2449) and incubated at 26° C. for 4-5 days until well sporulated.

Twenty ml. of sterile water was then added to the Blake bottle and the spores scraped into suspension. About 5 ml. of the resulting spore suspension was added to a 2 liter baffled Erlenmeyer flask containing 750 ml. of a sterile aqueous medium consisting of 0.3% beef extract
1.0% casein hydrolysate (NZ amine)
1% dextrose
0.5% sodium chloride and having a pH of about 7.2. The flask was then stoppered with cotton and incubated at 26° C. on a rotary shaker for 48 hours.

The vegetative culture so prepared was then added to a 50 gallon stainless steel fermentor containing about 25-30 gallons of a sterile beef extract medium of the composition described above. After adding 3% of Alkaterge C (a substituted oxazoline) in mineral oil as an antifoam agent the medium was incubated at 26° C. for 48 hours. During this incubation period the medium was agitated and sterile air was passed through the medium at the rate of 3 c.f.m.

A 200 gallon stainless steel fermentor was then charged with about 100 gallons of an aqueous medium containing the following ingredients:

3% soybean meal (Staley 4S–50)
   2% dextrose
   0.75% distiller's solubles
   0.25% sodium chloride This medium had a pH of about 7.1. After sterilizing the medium with steam at about 120° C. for thirty minutes, the fermentor was inoculated with about 8.4% of the vegetative inoculum prepared in the 50 gallon fermentor as described above. The batch was then incubated at 26° C. with agitation and aeration at the rate of 12 c.f.m. After 96 hours the fermented broth containing novobiocin had an activity of about 410 units per ml.

Novobiocin reacts like an acidic organic compound and is easily soluble in alkaline solutions such as aqueous solutions of alkali metal hydroxides, carbonates, and bicarbonates, and also in methanol, ethanol, normal butanol, secondary butanol, acetic acid, dioxane acetone, and methyl ethyl acetone. It is insoluble or sparingly soluble in ether, benzene, ethyl acetate, chloroform, carbon tetrachloride, ethylene dichloride, water and hydrochloric acid. Novobiocin can be precipitated from alkaline solution by acidification.

Novobiocin has been obtained in two crystalline forms by the methods described above. One crystalline form of novobiocin which appears to be in the form of rosettes has a melting point at about 152–154° C.; another crystalline form which has the appearance of flat needles was found to melt at about 170–172° C. These forms are sometimes produced together and can be separated mechanically.

A solution of novobiocin in 0.1 N sodium hydroxide exhibits a characteristic ultraviolet absorption with a peak at about 3,070 A. (E% 600). A solution of novobiocin in 0.1 N hydrochloric acid in aqueous methanol also shows a characteristic ultraviolet absorption with a peak at about 3,240 A. (E% 390).

The infrared absorption spectrum of a substantially pure sample of amorphous novobiocin suspended in a mineral oil (Nujol) was taken on a Baird Associates Model 12B infrared spectrophotometer using a sodium chloride prism showed a number of characteristic peaks, the more significant of which are at the following frequencies, expressed in microns 5.8–6.0 (broad), 6.10, 6.21, 6.30, 6.49, 6.63, 7.4–7.6 (broad-shoulder), 7.78, 7.96, 8.27 (weak), 8.60 (shoulder), 8.7 (shoulder), 9.13, 9.40, 10.0–10.1 (broad), 10.28, 10.60 (broad), 12.0–12.30 (broad), 12.60–12.75 (broad), 13.07 and 13.39. The sample of amorphous novobiocin used in determining this spectrum was prepared from a sample of crystalline novobiocin by the following "normalization" procedure:

To a solution of one gram of crystalline novobiocin in 100 ml. of acetone was quickly added one liter of petroleum ether whereupon amorphous novobiocin separated from solution. The precipitated product was recovered by filtration, washed with petroleum ether and finally dried at 100° C. under diminished pressure.

Novobiocin contains the elements carbon, hydrogen, nitrogen and oxygen. The following is an analysis of the elemental composition obtained on a sample of crystalline novobiocin:

|  | Percent |  |
|---|---|---|
| Carbon | 60.24 | 60.26 |
| Hydrogen | 6.56 | 6.49 |
| Nitrogen |  | 4.86 |
| Oxygen |  | 29.3 |

Novobiocin is an acidic substance which forms salts upon reaction with bases. Thus, upon reacting novobiocin with one equivalent of sodium hydroxide the monosodium salt of novobiocin is obtained. Reaction with two equivalents of sodium hydroxide yields the disodium salt of novobiocin. Similarly, upon reacting novobiocin with other inorganic bases, the corresponding metal salts can be obtained. When novobiocin is reacted with an organic base such as an amine, the corresponding amine salts are obtained. Thus, upon reacting novobiocin with methyl amine, the methyl amine salts of novobiocin is obtained.

The acidic nature of novobiocin is also a distinguishing characteristic of this new antibiotic when a sample of novobiocin is triturated with sodium hydroxide two basic binding groups are observed. The first forming the monosodium salt occurs at a pH of about 7.0 and has a pK of about 3.8. The second binding occurs at a pH of about 11.0 and has a pK of about 9.4.

Crystalline novobiocin has a microbiological activity of about 4,000–5,000 units per mgm. as determined by standard cup-plate diffusion methods using *Bacillus megatherium* ATCC 9885; employing a substantially pure form of novobiocin as the standard. The assay method is the same as that used for the assay of bacitracin.

Novobiocin is active in inhibiting gram-positive microorganisms primarily, although it also exhibits some activity against gram-negative microorganisms. Among the organisms whose growth is inhibited by very low concentrations of novobiocin or its salts, that might be mentioned are: *M. pyogenes* var. *albus, M. pyogenes* var. *aureus, Diplococcus pneumoniae, Corynebacterium diphtheriae* type *gravis, Corynebacterium diphtheriae* type *intermedius, Corynebacterium diphtheriae* type *mitis, Corynebacterium xerose, Corynebacterium, renale, Neisseria meningitidis, Sarcina lutea* (VD), *M. Aureus, M. pyogenes* var. *aureus* resistant to aureomycin, *M. pyogenes* var. *aureus* resistant to streptomycin-streptothricin, and *M. pyogenes* var. *aureus* resistant to penicillin.

For example, the sodium salt of novobiocin when tested by the agar streak dilution assay was found to inhibit the growth of various species of *M. pyogenes* var. *aureus, M. pyogenes* var. *albus, Neisseria meningitidis* (No. 274), and *Sarcina lutea* (VD) at concentrations below 0.5 mcg. per ml. Other microorganisms are also affected by novobiocin or its salts in varying degrees.

Novobiocin and its salts are useful antimicrobial agents. For example, they can be utilized to remove susceptible microorganisms from pharmaceutical equipment and the like, or to separate certain microorganisms from solutions containing mixtures of several microorganisms. Also, novobiocin or its salts are useful in the treatment of animals infected with microorganisms which are susceptible to the action of this new antibiotic.

Novobiocin and salts thereof are active against penicillin resistant Staphylococci and also against Streptococci and Pneumococci. Since these organisms are responsible for most bacterial respiratory infections, novobiocin can be used in the treatment of such infections in humans. For this purpose the sodium salt of novobiocin can be administered orally in the form of capsules containing, for example, about 100 to 500 mgs. of the antibiotic at a daily dosage level of one to two grams.

Novobiocin is also effective in the treatment and control of plant diseases. Thus, it can be used in the control of bean blight caused by *Xanthomonas phaseoli*. For this purpose the plants are sprayed with an aqueous solution containing about 100 parts per million of the sodium salt of novobiocin. Such sprays may contain various wetting or spreading agents and/or other active agents, and can be prepared in accordance with methods well known in the art.

Various changes and modifications in the procedures herein disclosed will occur to those skilled in the art, and to the extent that such changes and modifications are em-

I claim:

A process for the isolation and purification of novobiocin from fermentation broth which comprises acidifying an aqueous alkaline solution of filtered fermentation broth containing diatomaceous earth to a pH of about 2 by the addition of hydrochloric acid, separating the mixture of precipitated novobiocin and diatomaceous earth, extracting said precipitate with methanol to obtain a methanolic solution of novobiocin, evaporating the resulting methanolic solution to a volume of about 1/10 of the original volume, adjusting the pH of the resulting solution to about 9.0 with sodium hydroxide, extracting said alkaline solution with butanol, evaporating the resulting butanol extract, dissolving the concentrate in an aqueous solution of sodium hydroxide to produce a solution having a pH of 9.0, adding a diatomaceous earth to the alkaline solution acidifying the alkaline solution by the addition of hydrochloric acid to a pH of 2.0, separating and drying the precipitated mixture of diatomaceous earth and novobiocin, triturating this precipitate with petroleum ether, removing the petroleum ether containing the dissolved impurities, extracting the residue by mixing with ethanol, intimately contacting the resulting ethanolic solution of novobiocin with acid-washed alumina in an amount equivalent to at least 50 parts by weight of alumina to the solids contained in the ethanolic solution, separating the alumina containing the adsorbed impurities, evaporating the resulting ethanol solution to a concentration of about 5% solids, adding water to said concentrate, in an amount just sufficient to produce turbidity and separating the crystallized novobiocin from the resulting solution.

References Cited in the file of this patent

UNITED STATES PATENTS

| | | |
|---|---|---|
| 2,378,449 | Tishler | June 19, 1945 |
| 2,378,876 | Waksman et al. | June 19, 1945 |
| 2,482,055 | Duggar | Sept. 13, 1949 |
| 2,653,899 | Bunch et al. | Sept. 29, 1953 |
| 2,657,170 | Keitt et al. | Oct. 27, 1953 |

OTHER REFERENCES

Baron Handbook of Antibiotics, page 82, published 1950 by Rheinhold Pub. Corp., N.Y.C.